(12) United States Patent
Yeung et al.

(10) Patent No.: US 10,169,258 B2
(45) Date of Patent: Jan. 1, 2019

(54) MEMORY SYSTEM DESIGN USING BUFFER(S) ON A MOTHER BOARD

(71) Applicant: Rambus Inc., Sunnyvale, CA (US)

(72) Inventors: Chi-Ming Yeung, Cupertino, CA (US); Yoshie Nakabayashi, Tokyo (JP); Thomas Giovannini, San Jose, CA (US); Henry Stracovsky, Portland, OR (US)

(73) Assignee: Rambus Inc., Sunnyvale, CA (US)

( * ) Notice: Subject to any disclaimer, the term of this patent is extended or adjusted under 35 U.S.C. 154(b) by 185 days.

(21) Appl. No.: 15/071,072

(22) Filed: Mar. 15, 2016

(65) Prior Publication Data

US 2016/0364347 A1     Dec. 15, 2016

Related U.S. Application Data

(60) Provisional application No. 62/173,134, filed on Jun. 9, 2015.

(51) Int. Cl.
*G06F 13/20* (2006.01)
*G06F 13/16* (2006.01)
*G06F 13/40* (2006.01)
*G06F 13/42* (2006.01)

(52) U.S. Cl.
CPC ...... *G06F 13/1673* (2013.01); *G06F 13/4022* (2013.01); *G06F 13/4068* (2013.01); *G06F 13/4282* (2013.01)

(58) Field of Classification Search
CPC ............. G06F 13/1673; G06F 13/4022; G06F 13/4282; G06F 13/4068
See application file for complete search history.

(56) References Cited

U.S. PATENT DOCUMENTS

| | | | |
|---|---|---|---|
| 6,587,912 B2 | 7/2003 | Leddige et al. | |
| 6,643,752 B1 | 11/2003 | Donnelly et al. | |
| 7,039,918 B2 * | 5/2006 | Jones | G06F 11/2736 710/31 |
| 7,072,201 B2 | 7/2006 | So et al. | |
| 7,155,627 B2 * | 12/2006 | Matsui | G06F 13/4243 713/400 |
| 7,650,557 B2 * | 1/2010 | Totolos, Jr. | G06F 11/106 714/718 |
| 7,899,984 B2 | 3/2011 | Risse | |

(Continued)

OTHER PUBLICATIONS

"Leader in Server Memory Interface Chipsets", Integrated Device Technology, Jun. 2017.*

(Continued)

*Primary Examiner* — Jing-Yih Shyu
(74) *Attorney, Agent, or Firm* — Lowenstein Sandler LLP

(57) ABSTRACT

A mother board topology including a processor operable to be coupled to one or more communication channels for communicating commands. The topology includes a first communication channel electrically coupling a first set of two or more dual in-line memory modules (DIMMs) and a first primary data buffer on a mother board. The topology includes a second communication channel electrically coupling a second set of two or more DIMMs and a second primary data buffer on the mother board. The topology includes a third channel electrically coupling the first primary data buffer, the primary second data buffer, and the processor.

17 Claims, 8 Drawing Sheets

(56) References Cited

U.S. PATENT DOCUMENTS

| | | | | |
|---|---|---|---|---|
| 8,060,774 B2* | 11/2011 | Smith | ............... | G06F 11/1076 |
| | | | | 714/6.22 |
| 8,694,857 B2* | 4/2014 | Wang | ............... | G06F 11/10 |
| | | | | 714/763 |
| 9,432,298 B1* | 8/2016 | Smith | ............... | H04L 49/9057 |
| 9,460,791 B1* | 10/2016 | Shallal | ............... | G11C 29/028 |
| 9,600,187 B2* | 3/2017 | Dell | ............... | G06F 12/0646 |
| 9,653,147 B1* | 5/2017 | Wang | ............... | H04L 25/028 |
| 2008/0077732 A1* | 3/2008 | Risse | ............... | G06F 13/1673 |
| | | | | 711/105 |
| 2008/0082732 A1 | 4/2008 | Karamcheti et al. | | |
| 2010/0262759 A1 | 10/2010 | Borchers et al. | | |
| 2010/0274956 A1 | 10/2010 | Karamcheti et al. | | |
| 2016/0217086 A1* | 7/2016 | Shan | ............... | G06F 13/1673 |

OTHER PUBLICATIONS

"DDR4 LRDIMM and RDIMM Solutions", Montage Technology, Jan. 2014.*

"Understanding and Testing DDR4 R-DIMM and LR-DIMM Technology", Integrated Device Technology, Jul. 2013.*

* cited by examiner

MEMORY SYSTEM DESIGN USING BUFFER(S) ON A MOTHER BOARD

CROSS REFERENCE TO RELATED APPLICATIONS

This application claims the benefit of and priority to the provisional patent application, U.S. Ser. No. 62/173,134, entitled "MEMORY SYSTEM DESIGN USING BUFFER (S) ON A MOTHERBOARD," with filing date Jun. 9, 2015, which is herein incorporated by reference in its entirety.

BACKGROUND

Increasingly, information is stored in large data storage systems. At a base level, these data storage systems are configured with multiple processors, each controlling access to corresponding memory. Generally, such processors are configured to control up to a certain amount of memory. However, scaling of memory by adding processors with corresponding memory can be unable to keep current with demands to increase memory capacity due to such issues as processor cost constraints and limited increases in memory per processor.

ACRONYMS, ABBREVIATIONS, & TERMS

MA—memory appliance
NPU—network processing unit
SMC—Smart Memory Cube
OCP—open compute project
FPGA—field programmable gate array
KV—key/value
AXI—Advanced eXtensible Interface
RegEx or regexp—regular expression
QoS—quality of service
FF—form factor
PDU—power distribution unit
PS—power supply
POR—plan of record
RAS—reliability, availability, and serviceability
MC—memory controller
HW or H/W—hardware
SW—software
DMA—direct memory access
CRC—cyclic redundancy check
Rd or RD—read
Wr or WR—write
FIFO—first-in first-out
PHY—physical layer
IO or I/O—input/output
ASIC—application specific integrated circuit
DIMM—dual in-line memory module
LR-DIMM—load reduced or reducing DIMM
R-DIMM—registered DIMM
U-DIMM—unregistered DIMM
CPU—central processing unit
CA or C/A—command/address
ECC—error correcting code
DDR—double data rate
Addr—address
RAM—random access memory
DRAM—dynamic random access memory
RDIMM—registered DIMM
B/W—bandwidth
OS—operating system
GPU—graphics processing unit
NVM—nonvolatile memory
SSD—solid state disk
DFS—distributed file system
IOPS—I/Os per second
PCB—printed circuit board
IP—internet protocol
NIC—network interface card
PCI—peripheral component interconnect
PCIe—peripheral component interconnect express
OSI—Open Systems Interconnection
TCP—transmission control protocol
UDP—user datagram protocol
EEPROM—electrically erasable programmable read-only memory
DPA—differential power analysis
PCQ—physical command queue
CCD—command control or copy daemon
RET—the last command in a chain
ROM—read only memory
CD-ROM—compact disc ROM
DVD—digital versatile disk
RF—radio frequency
ISA—Industry Standard Architecture
SCSI—Small Computer System Interface
USB—universal serial bus
WAN—wide area network
LAN—local area network
PAN—personal area network
NAS—network attached storage
NFS—network file system
SMB—server message block
CIFS—common internet file system
SAN—storage area network
JEDEC—Joint Electron Device Engineering Council

BRIEF DESCRIPTION OF THE DRAWINGS

Further aspects of the present disclosure will become apparent from the following description which is given by way of example only and with reference to the accompanying drawings in which.

DETAILED DESCRIPTION

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Memory Appliance System

Figure 1:
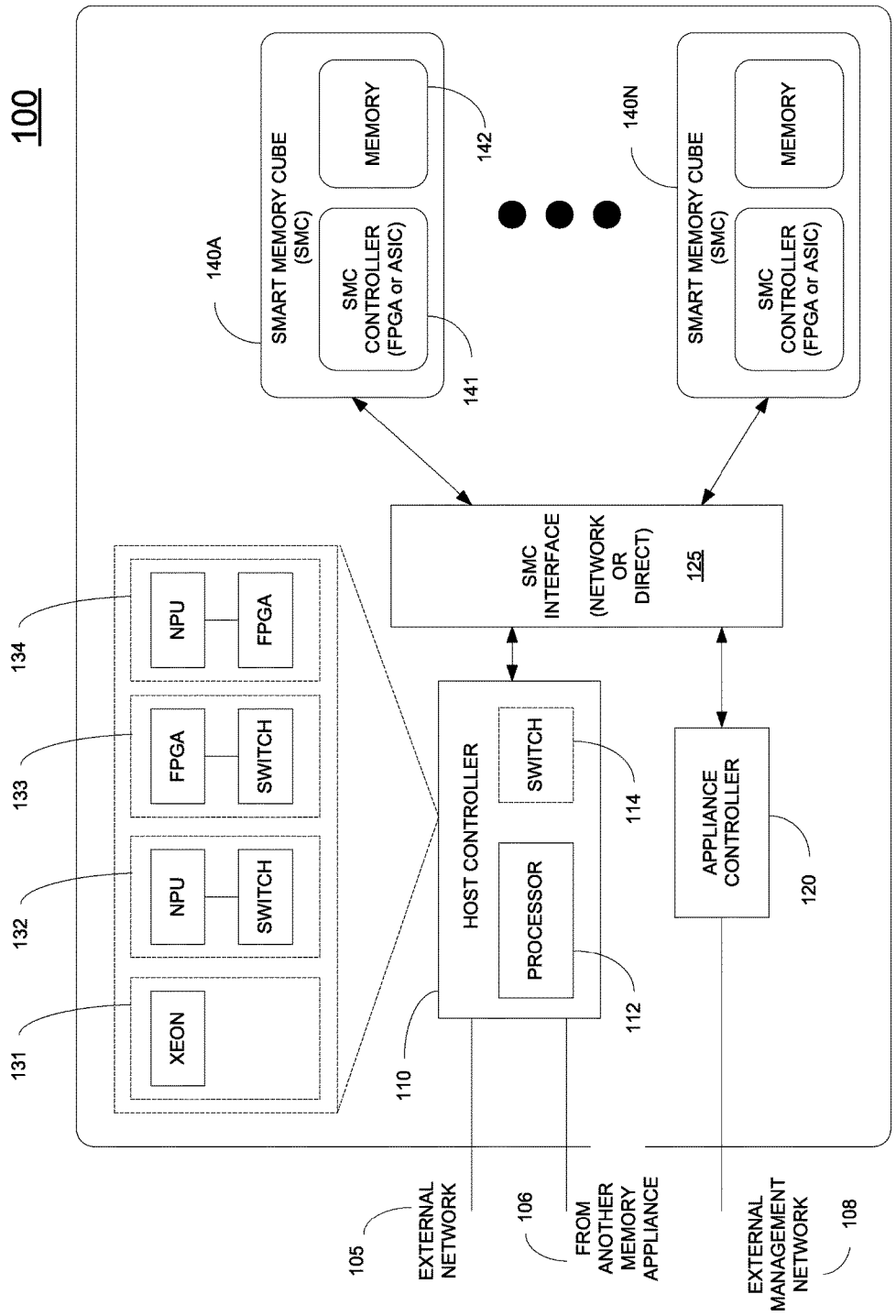
FIG. 1 is a block diagram of a memory appliance including a SMC including SMC controllers implemented as FPGAs and/or ASICs, in accordance with one embodiment of the present disclosure.

FIG. 1 is a block diagram of a memory appliance system 100, in accordance with one embodiment of the present disclosure. In one embodiment, the memory appliance system 100 provides for higher capacity and higher bandwidth scaling of memory and computation offloading to the memory with the use of programmable memory interfaces between network interface 125 and SMCs 140A-N. In another embodiment, the memory appliance system 100 provides for a higher rate of scaling of memory with the use of hardware implemented ASICs memory interfaces. Both the programmable and ASIC implementable memory interfaces on the memory side of an interface are configured to control and perform application specific primitive operations on memory that are typically controlled by a processor on the other side of the interface. Memory appliance system 100 is configured to receive high level command or instructions (e.g., OSI layer 7 protocol or interface command from a client system), and to translate the instructions into lower-level assembly code style primitive operations that are executable by a plurality of SMC controllers. By controlling and performing these primitive operations at the memory, data from each primitive operation need not be delivered back-and-forth over the interface, thereby greatly reducing and/or avoiding the latency buildup normally experienced with increased scaling of memory.

The memory appliance 100 includes a plurality of smart memory units or Smart Memory Cubes (SMCs) 140A-N, each of which includes memory. The term "SMCs" is used throughout this disclosure for ease of reference but is not meant to impart a special definition or suggest that particular functions or aspects are required. As such, memory is distributed throughout the memory appliance 100 in the plurality of SMCs 140A-N. The memory appliance 100 can be configured as a stand-alone unit, or as a scalable unit. That is, in a scalable configuration a plurality of similarly configured memory appliances may be combined to form a non-limited and scalable configuration of memory.

In either the stand-alone or scalable configurations, an appliance controller 120 is coupled to the plurality of SMCs 140A-N through a command interface in order to provide configuration information for memory contained within the SMCs 140A-N. The appliance controller 120 may be coupled to higher level controller that remotely manages one or more memory appliances through an external management network 108. For example, operations performed by the appliance controller 120 alone or in cooperation with a remote manager include discovery of memory, provision of memory (e.g., within a virtual memory device), event logging, remote management, power and/or thermal management, monitor, and control.

As shown in FIG. 1, the memory appliance system includes a host controller 110 that is configured to perform processing and switching operations. More particularly, host controller 110 manages memory distributed throughout the plurality of SMCs 140A-N in the memory appliance system 100. Additionally, the host controller 110 is operable to be coupled to one or more communication channels with a command interface, wherein the communication channels are coupled over an interface 125 to memory. Also some form of notification (e.g., pointers to memory) or results is also delivered through the interface 125 back to the host controller 110.

The host controller 110 includes a processor 112 and an optional switch 114, in one implementation. The processor 112 generates and communicates commands over the one or more communication channels, wherein the commands are configured for accessing memory distributed throughout a plurality of SMCs. For example, the processor 112 is configured to receive high level commands (e.g., from a client side database application implementing Memcached) and translate those commands to a series of primitive commands that are operable within each of the SMCs for accessing and/or operating on data stored in memory. In addition, the switch 114 is configurable to deliver a corresponding command or series of commands to the proper SMC for accessing and/or performing operations on memory.

The processor 112 in the host controller 110 is configured to receive and send communications over an external network 105. In one example, the external network provides an interface with a client device. In another example, an external network 106 is configured to provide communications between memory appliances. In one embodiment, the external networks 105 and 106 are similarly configured. In one embodiment, the processor 112 is coupled to a NIC to provide access to the external network. In another embodiment, the processor 112 is configured as a NPU that includes an internal communication interface for communicating with the external network. In still another embodiment, the processor 112 is configured as an FPGA.

Various configurations are supported for the host controller. For illustration purposes only, as shown in FIG. 1, a first configuration 131 includes a CPU (e.g., an Intel XEON® processor), a second configuration 132 includes an NPU configured for performing processing operations, and a switch for performing switching operations; a third configuration 133 includes an FPGA configured for performing processing operations, and a switch for performing switching operations; and a fourth configuration 134 includes an NPU configured for performing processing operations, and an FPGA configured for performing switching operations. Other configurations are supported, such as an Intel XEON® processor and a switch for performing switching operations.

The processor 112 is configured to manage memory throughout the plurality of SMCs in the memory appliance system when performing host controller duties. For example, the processor 112 in the host controller 110 is configured to provide memory services, such as, load balancing, quality of service, connection management, and traffic routing. Further, in one embodiment, the host controller 110 manages memory in the memory appliance system as a virtual memory system.

The plurality of SMCs 140A-N is coupled to the processor 112 through one or more communication channels established through a command interface 125, also referred to as the SMC interface 125. In that manner, commands generated by or passed through the processor 112 are delivered to the plurality of SMCs 140A-N through the command interface 125.

In one embodiment, the communication channels in the command interface 125 comprises a network interface for providing communication between the host controller 110 and the plurality of SMCs 140A-N. That is, communication between the processor and the plurality of SMCs is accomplished using networking protocols. For instance, the network interface may be configured using one of the following protocols: a TCP; a UDP; Ethernet; Infiniband; Fiber Channel, and other networking protocols.

In another embodiment, the communication channels in the command interface 125 comprise a direct interface. That is, the processor 112 and each of the plurality of SMCs communicate over a point-to-point communication channel or link between two ports. For example, the link may establish a point-to-point communication using the PCIe interface, or one of its derivatives, that is a high-speed serial computer expansion bus standard.

Each SMC includes a brick or unit controller (also referred to as the SMC controller) that is hardwired or programmable to execute application specific commands and/or operations generated by an external client and/or application. For illustration, SMC 140A, including its components, is representative of each of the plurality of SMCs 140A-N. For example, SMC controller 141 is configured to perform data operations on the content that is included in memory 142. In one embodiment, the data operations are performed transparently to the command interface and/or requesting client (communicatively coupled through the external network 105). That is, once a high level command or instruction is delivered over the command interface from the requesting client, control over execution of the primitive data operations based on the high level command is handed over to the SMC controller 141. For example, data operations include search, sort, and other custom accelerations.

In one embodiment, the SMC controller 141 in SMC 140A is configured as a FPGA that is pre-programmed with the proper functionality to handle a requested command. In another embodiment, the FPGA is programmed on-the-fly depending on the request made on the memory 142 contained within SMC 140A. For example, the FPGA is configured to generate and compile primitive operations when receiving one or more high level commands, wherein the primitive operations are executable by the FPGA. In another embodiment, the FPGA is configured to access configuration files for programming with the proper functionality. In still another embodiment, the SMC controller 141 is implemented through an ASIC device providing application specific operations.

In embodiments, the SMC controller 141 is configured to respond to primitive commands delivered over the command/SMC interface 125 to access and/or perform operations on content stored in memory 142. More specifically, processor 112 is configured to receive high level commands over the external network 105 (e.g., from a client application) and translate each of the commands to one or more primitive operations. The primitive operations are delivered over the command/SMC interface 125 for handling by the SMC controller 141. In that manner, by handling these primitive operations at the memory, the step by step control of the primitive operations associated with a particular high level command need not be controlled by processor 112, thereby reducing and/or avoiding latency due to increased scaling of memory in the plurality of SMCs 140A-N.

For example, the plurality of memory devices in memory appliance 100 may be configured as a Memecached memory system that is a general-purpose distributed memory caching system. As such, the primitive commands are designed to implement access and manipulation of data within the Memecached memory system. In particular, access to memory in the Memcached memory system is performed using a key value pair or key value functions as implemented through the primitive operations. For example, using one or more primitive operations, a key within a command is hashed using the appropriate algorithm in order to determine proper addressing within the memory. Typical key value commands/functions include "GET" and "SET" and "DELETE" operations that are each further translated into one or more primitive operations handled by the corresponding SMC.

Further, in one embodiment the SMC controller 141 in SMC 140A is configured to respond to high level commands delivered over the command/SMC interface 125 to access and/or perform operations on content stored in memory 142. That is, the SMC controller 141 can be configured to translate the high level commands into a format suitable for use within the SMC controller 141 when interfacing with memory 142. That is, instead of performing translation at processor 112, the translation of high level commands into primitive operations suitable for use within the SMC controller 141 is performed locally.

In one embodiment, SMC controller 141 is configured to provide custom acceleration of data operations. Some examples of custom accelerations include, but is not limited to, error recovery, data manipulation, and data compression. For example, SMC controller 141 may be configured to handle one or more application specific operations (e.g., Memecached search operation). In one embodiment, SMC controller 141 is programmable such as through an FPGA to handle a specific operation. In another embodiment, SMC controller 141 is programmed on-the-fly to handle an incoming operation. In still another embodiment, SMC controller is implemented through an ASIC that is configured to handle one or more application specific operations.

Further, the SMC controller 141 may include an additional processor for handling less time sensitive functions, such as, management and control of the memory devices. For instance, instructions coming from the appliance controller 120 are handled by this additional processor (e.g., SMC micro-controller described in FIG. 4).

In addition, each SMC includes a plurality of memory devices. For example, SMC 140A includes memory 142. In one embodiment, the plurality of memory devices in a corresponding SMC includes memory devices packaged in a DIMM, registered memory module (RDIMM), and/or load reduced memory (LRDIMM). In one further embodiment, the memory devices packaged in a corresponding DIMM include DRAM memory devices. In another embodiment, the memory devices packaged in a corresponding DIMM include non-volatile read/write memory (e.g., FLASH). In still another embodiment, the memory devices packaged in a corresponding DIMM include non-volatile memory devices (e.g., FLASH, EEPROM).

In one embodiment, each SMC is configured with multiple channels (e.g., four), each of which is suitable for handling multiple DIMMs (e.g., six). In an example, SMC 140A is able to handle up to and more than twenty-four DIMMs given four channels, and six DIMMs per channel. In one embodiment, SMC 140A s able to handle up to and more than thirty-two DIMMs given four channels. In still other embodiments, the number of channels may number 4 or more, with up to and more than 8 DIMMs per channel. As demonstrated, embodiments of the present disclosure provide for a larger amount of DIMMs per SMC for increased scalability.

Figure 2:
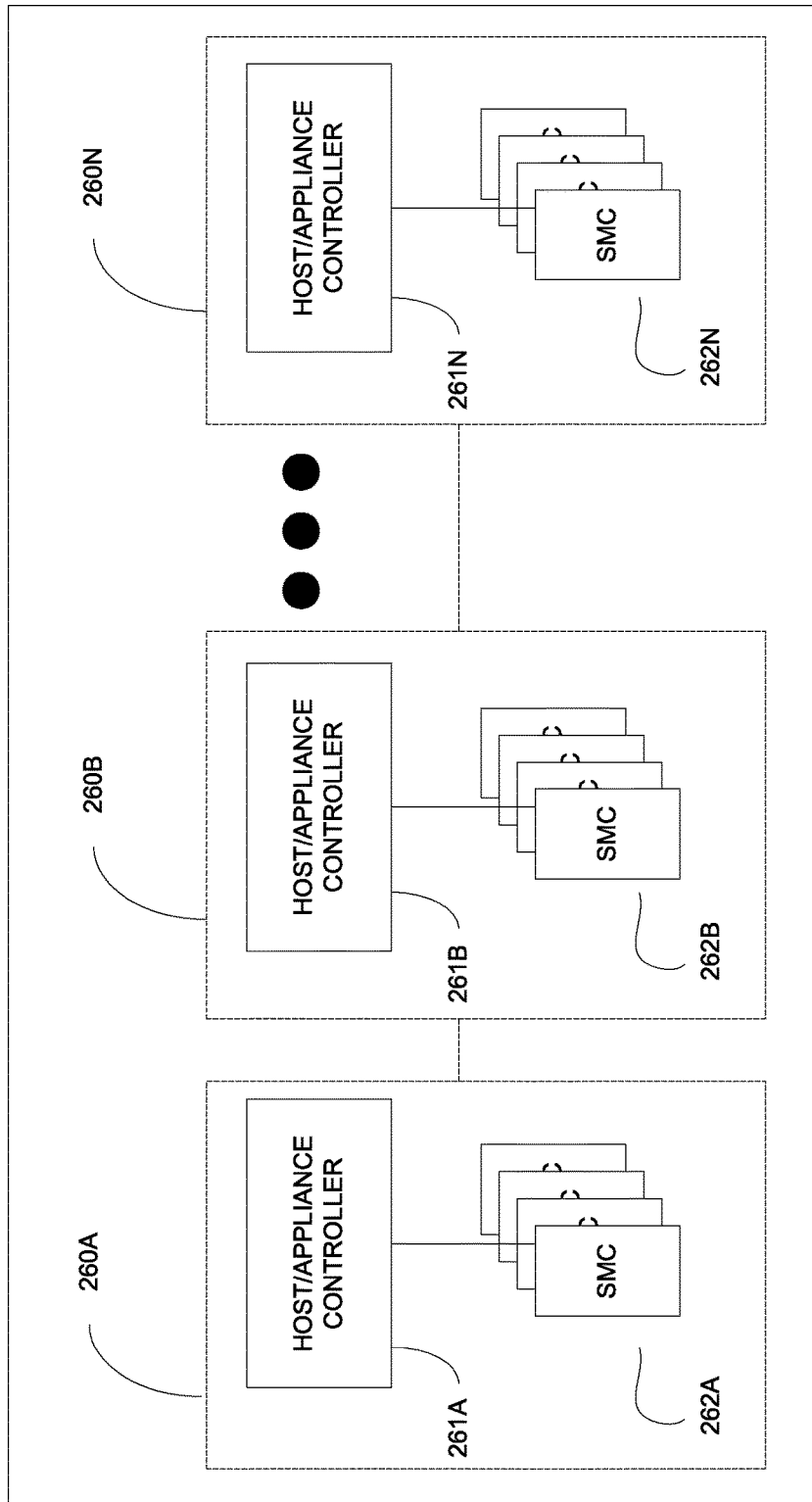
FIG. 2 is a block diagram of a plurality of memory appliances, in accordance with one embodiment of the present disclosure.

FIG. 2 is a block diagram of a memory system 200 including plurality of memory appliances 260A-N, in accordance with one embodiment of the present disclosure. The plurality of memory appliances 260A-N provide access to internal memory devices. That is, each of the memory appliances 260A-N provides access to corresponding memory. In particular, the plurality of memory appliances 260A-N includes a first memory appliance system (e.g., 260A) and at least one other, or second, memory appliance system (e.g., 260B). Both memory appliance systems are similarly configured, such as, that described in FIG. 1 For example, each of the memory appliance systems include a host controller for managing data across a corresponding plurality of SMCs.

For illustration, memory appliance 260A provides access to memory 262A through host controller 261A, wherein memory 262A includes one or more SMCs; memory appliance 260B provides access to memory 262B through host controller 261B, wherein memory 262B includes one or more SMCs; and memory appliance 260N provides access to memory 262N through host controller 261N, wherein memory 262N includes one or more SMCs. In one embodiment, the memory devices are configured as virtual memory, wherein distributed memory devices are accessible by each of the host controllers of the plurality of memory appliances.

In one embodiment, the host controllers of the plurality of memory appliances 260A-N are in communication to facilitate a distributed memory system 200. For example, an external communication interface is configured to provide communication between host controllers within the plurality of memory appliances 260A-N to provide access to memory virtualized across one or more memory appliance systems. The communication interface can include a fat pipe configured as a higher speed and higher bandwidth communications channel for communicating data, and a skinny pipe as a lower speed and lower bandwidth communications channel configured for communicating instructions/control.

Improving Electrical Performance of a Memory System by Using Buffer Chips

Embodiments of the present disclosure can be implemented within the SMCs of FIGS. 1 and 2. A controller in the SMC is configured with a direct connection to one or more DIMMs. Heretofore, memory systems typically supported two to three DIMMs per channel of a controller. However, embodiments of the present disclosure are able to support more DIMMs per channel. For instance, embodiments of the present disclosure are able to support up to and more than eight DIMMs per channel in a corresponding SMC. In one example, the SMC supports eight DIMMs per channel, with four ranks per DIMM.

In particular, embodiments of the present disclosure are able to improve memory capacity by reusing the same DIMM buffer chips on the mother board to buffer the signal. For DDR4, this can include the use of an address buffer and multiple data buffers on the mother board. As such, the memory system is configured to support eight to 12 DIMMs per logical memory channel of a memory controller in an SMC.

While embodiments of the present disclosure are described within the context of increasing the number of DIMMs per memory channel of a memory controller within an SMC, other embodiments are well suited to increasing the number of DIMMs per channel of any memory controller that may not be configured as an SMC.

For purposes of clarity, in FIGS. 3-6 a node is indicated by a filled-in dot and is intended to show a coupling between lines and/or channels intersecting with the node. Any lines that cross at an intersection that does not include a node designator are not electrically coupled together while any lines and/or channels shown as entering a box(s) are intended to show an electrical coupling between the lines and/or channels and the box(s) (e.g., first communication channel 370 is electrically coupled to each of DIMMs 330A-D as a single node).

Figure 3:
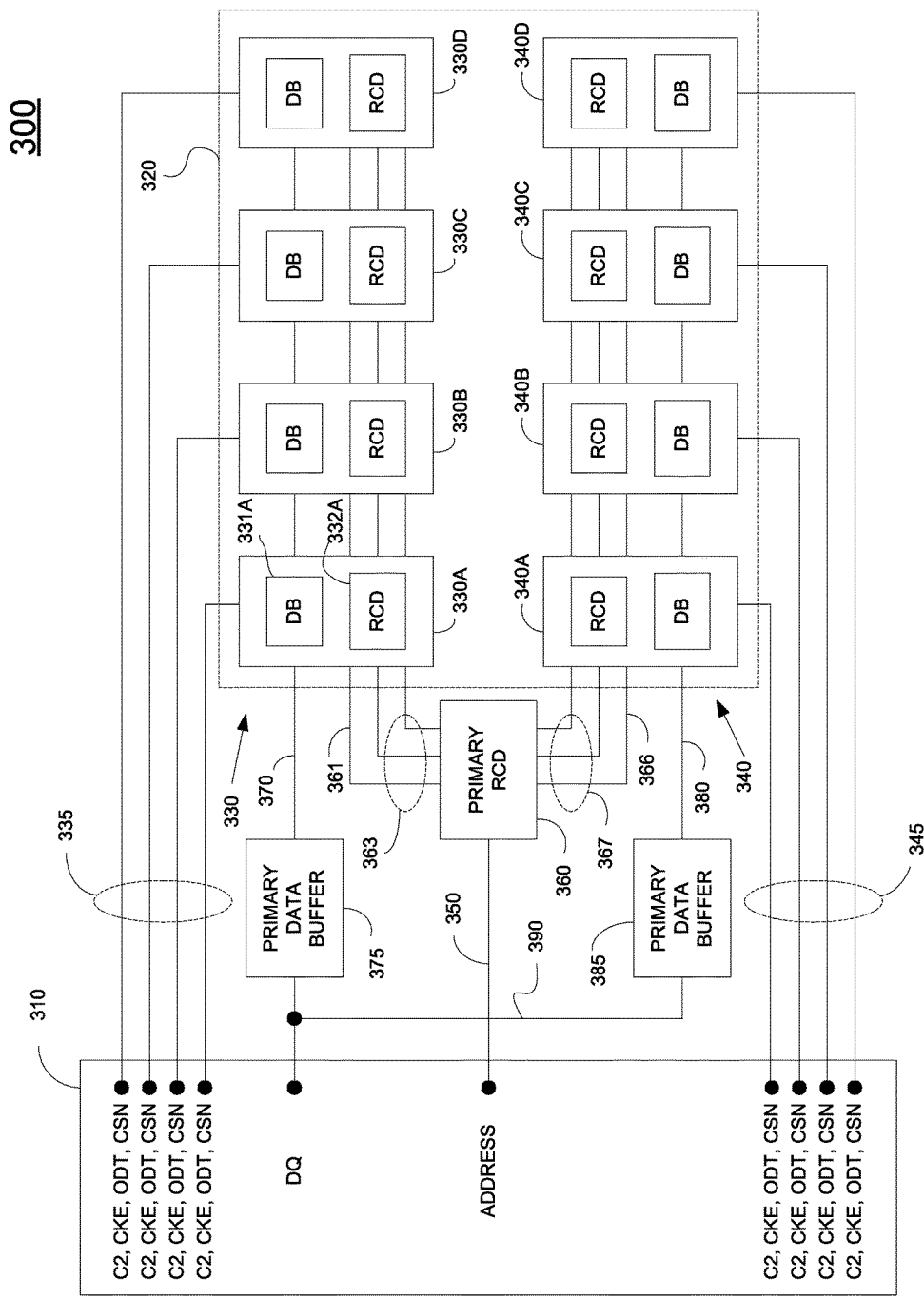
FIG. 3 is a block diagram of a memory unit that is configured for reusing DIMM buffer chips on the mother board to buffer signals in order to increase the number of DIMMs per channel of a memory controller, wherein the DIMMs are configured as LR-DIMMs, in accordance with one embodiment of the present disclosure.

FIG. 3 is a block diagram of a memory unit 300 that is configured for reusing DIMM buffer chips on the mother board to buffer signals in order to increase the number of DIMMs per channel of a memory controller, in accordance with one embodiment of the present disclosure. In that manner, the total memory capacity is increased per logical channel of a memory controller. For example, the memory unit may comprise an SMC 140A of FIG. 1 that is include within a memory appliance, and illustrates the connections between a processor or memory controller, primary buffers, and DIMM buffers contained within LR-DIMMs, in accordance with one embodiment of the present disclosure. In one embodiment, memory unit 300 is representative of a mother board topology.

As a further advantage, since DIMM buffers typically have a much higher production volume than any other custom buffer solution, by reusing the same DIMM buffers, embodiments of the present disclosure should allow for lower production and development costs.

As shown in FIG. 3, a processor 310 is operable to be coupled to one or more communication channels for purposes of communicating commands. In one embodiment, processor 310 is a memory controller 310 configured to execute commands and/or operations on content that is included in memory 320. For example, data operations include search, sort, and other custom accelerations. In one embodiment, the processor 310 comprises a controller that is programmable. For example, processor 310 is configured as an FPGA. The FPGA may be pre-programmed with proper functionality to handle a requested command, or may be programmed on-the-fly depending on its configuration. In still another embodiment, processor 310 is implemented through an ASIC device providing application specific operations.

Memory 320 includes a plurality of memory devices. In one embodiment, the plurality of memory devices in a corresponding SMC includes memory devices packaged in DIMM, R-DIMM, U-DIMM, LR-DIMM, SO-DIMM, SOR-DIMM, VLP R-DIMM, VLP Mini-R-DIMM, Mini-R-DIMM, VLP-U-DIMM, Mini-U-DIMM, VLP-Mini-U-DIMM, etc. configurations. As shown in FIG. 3, the memory devices are packaged in a LR-DIMM configuration. In one further embodiment, the memory devices packaged in a corresponding DIMM include DRAM memory devices. In another embodiment, the memory devices packaged in a corresponding DIMM include non-volatile read/write memory (e.g., FLASH). In still another embodiment, the memory devices packaged in a corresponding DIMM include non-volatile memory devices (e.g., FLASH, EEPROM). In still other embodiments, memory devices are not attached as a memory module to a motherboard, but may be directly incorporated into the motherboard utilizing any suitable memory configuration.

Embodiments of the present disclosure are described using JEDEC standardized DDR synchronous DRAM in a DDR SDRAM memory system. For example, the DDR SDRAM memory system complies with the DDR standard or one or its derivatives (e.g., DDR3, DDR4, etc.).

In particular, the plurality of memory devices is distributed throughout a first and second set of DIMMs, wherein the processor is configured to respond to commands to access content stored in one or more of the plurality of memory devices, and to perform data operations on content accessed from the plurality of memory devices. Specifically, memory 320 includes a first set of two or more DIMMs 330. For instance, the first set 330 includes DIMMs 330A-D. Also, memory 320 includes a second set of two or more DIMMs 340. For instance, the second set 340 includes DIMMs 340A-D. Although only four DIMMs are shown in each of the first and second sets of DIMMs 330 and 340, it is appreciated that any number of DIMMs may be included depending on the rank timing limitations of the primary data buffer. As shown in FIG. 3, eight DIMMs are shown coupled to the processor 310 through one or more buffers, as will be described below.

As shown in FIG. 3, rank control signals are provided from the processor 310 to each of the DIMMs in the first and second sets 330 and 340. For instance, C2, CKE, ODT, and CSN control signals are provided in direct point-to-point communication, wherein a dedicated control channel is provided from the processor 310 to each of the DIMMs in the first and second sets of DIMMs 330 and 340. In one implementation, there are four CSN control signals, wherein two CSN control signals double as C[1:0]. The control signals are directed to a rank of memory devices in a corresponding DIMM, wherein each DIMM may include one or more ranks, wherein each rank may include one or more memory devices. For example, point-to-point channels 335 are coupled to DIMMs 330A-D in the first set of DIMMs 330 in one-to-one relationships. Also, point-to-point channels 345 are coupled to DIMMs 340A-D in the second set of DIMMs 340 in one-to-one relationships.

In addition, command, address, control and clock connections are provided to each of the DIMMs in the first and second sets of DIMMs 330 and 340. As shown in FIG. 3, a command, address, control, or clock signal is provided from the processor 310 over path 350 to a primary register clock driver (RCD) buffer 360. For example, command, address and control signals include memory commands (e.g., search, sort, read, write, etc.).

The primary RCD buffer 360 forwards the command, address, and clock signals to an internal RCD address buffer in a corresponding DIMM. That is, each DIMM includes an internal RCD address buffer. As a representative example, DIMM 330A includes internal RCD address buffer 332A. For instance, primary RCD buffer 360 is electrically coupled in parallel to RCD address buffers in each of the DIMMs in the first and second sets of DIMMs 330 and 340. As shown, command, address, and clock signals are delivered over channels 363 that are coupled in parallel to DIMMs 330A-D in the first set of DIMMs 330. Also, command, address, and clock signals are delivered over channel 367 that are coupled in parallel to DIMMs 340A-D in the second set of DIMMs 340. In particular, an address signal is driven by primary RCD buffer 360 over path 361 in parallel to each of the internal RCDs address buffers in DIMMs 330A-D in the first set of DIMMs 330. Also, an address signal is driven by primary RCD buffer 360 over path 366 in parallel to each of the RCD address buffers in DIMMs 340A-D in the second set of DIMMs 340. Further, primary RCD buffer 360 command outputs drive four DIMMs, and primary RCD buffer 360 clock outputs drive 2 DIMMs each.

More particularly, the memory topology in the memory unit 300 includes a first communication channel 370 electrically coupling a first set of two or more DIMMs 330 and a first primary data buffer 375, for example on a mother board. The communication channel 370 is coupled in parallel from the first primary data buffer 375 to each of the DIMMs 330A-D in the first set of DIMMs 330. As shown, primary data buffer 375 drives four DIMMs.

Also, the memory topology in the memory unit 300 includes a second communication channel 380 electrically coupling a second set of two or more DIMMs 340 and a second primary data buffer 385, for example on the mother board. The communication channel 380 is coupled in parallel from the second primary data buffer 385 to each of the DIMMs 340A-D in the second set of DIMMs 340. As shown, primary data buffer 385 drives four DIMMs.

Furthermore, the memory topology in the memory unit 300 includes a third communication channel 390 electrically coupling the first primary data buffer 375 to the second primary data buffer 385. In addition, the third communication channel 390 is coupled to the processor 310. In that manner, data signals generated and/or forwarded by the processor 310 are delivered of the primary data buffer 375 and 385. The data signals are then delivered to the DIMMs in the first and second sets of DIMMs 330 and 340.

The primary data buffers 375 and 385 help to re-drive the data signals coming from the processor 310, and provides them to the ranks in the DIMMs of the first and second sets of DIMMs 330 and 340. In particular, the primary data buffers 375 and 385 help to isolate the memory devices from the processor 310, which thus reduces the electrical load on the interfaces between components. This allows for a higher memory capacity (e.g., greater number of DIMMs per channel). In one embodiment, the primary data buffers 375 and 385, in addition performing passive coupling and power splitting, also perform sampling and retransmission of the data signal. As such, primary data buffers 375 and 385 (e.g., buffers on board [BoBs]) help with timing and electrical isolation, and are used to increase the number of DIMMs without changing the hardware in each DIMM. Further, in one embodiment primary data buffers 375 and 385 are identical to the internal data buffers located in the DIMMs, and as such, by using existing technology, limited or no redesign of components (e.g., for data buffers 375 and 385) and/or layout of the motherboard is realized.

In still another embodiment, each DIMM 330A-D in the first set of DIMMs 330 includes an internal data buffer. As a representative example, DIMM 330A includes internal data buffer 331A. Furthermore, each DIMM in the first set of DIMMs 330 is electrically coupled to the primary data buffer 375 via the communication channel 370. For example, DIMMs 330A-D are coupled in parallel to the primary data buffer 375 via communication channel 370. In one embodiment, the internal data buffers are identical to the primary data buffers 375 and 385 to reduce production and development cost.

Correspondingly, each DIMM 340A-D in the second set of DIMMs 340 includes an internal data buffer. Further, each DIMM in the second set of DIMMs 340 is electrically coupled to the primary data buffer 385 via the communication channel 380. For example, DIMMs 340A-D are coupled in parallel to the primary data buffer 385 via communication channel 380. In one embodiment, the internal data buffers are identical to the primary data buffers 375 and 385 to reduce production and development cost.

Each of the internal DIMM data buffers also helps to re-drive the data signals coming from a corresponding primary data buffer 375 and 385, and provides them to the ranks in the corresponding DIMMs of the first and second sets of DIMMs 330 and 340. These internal data buffers helps to further isolate the memory devices from the primary data buffers 375 and 385, which reduces the electrical load on the interfaces between components (e.g., reduces the loads that affect primary data buffers 375 and 385, and also reduces the rank timing requirements of the primary data buffers 375 and 385), thereby allowing for higher memory capacity (e.g., up to and more than 8 DIMMs per channel).

Figure 4:
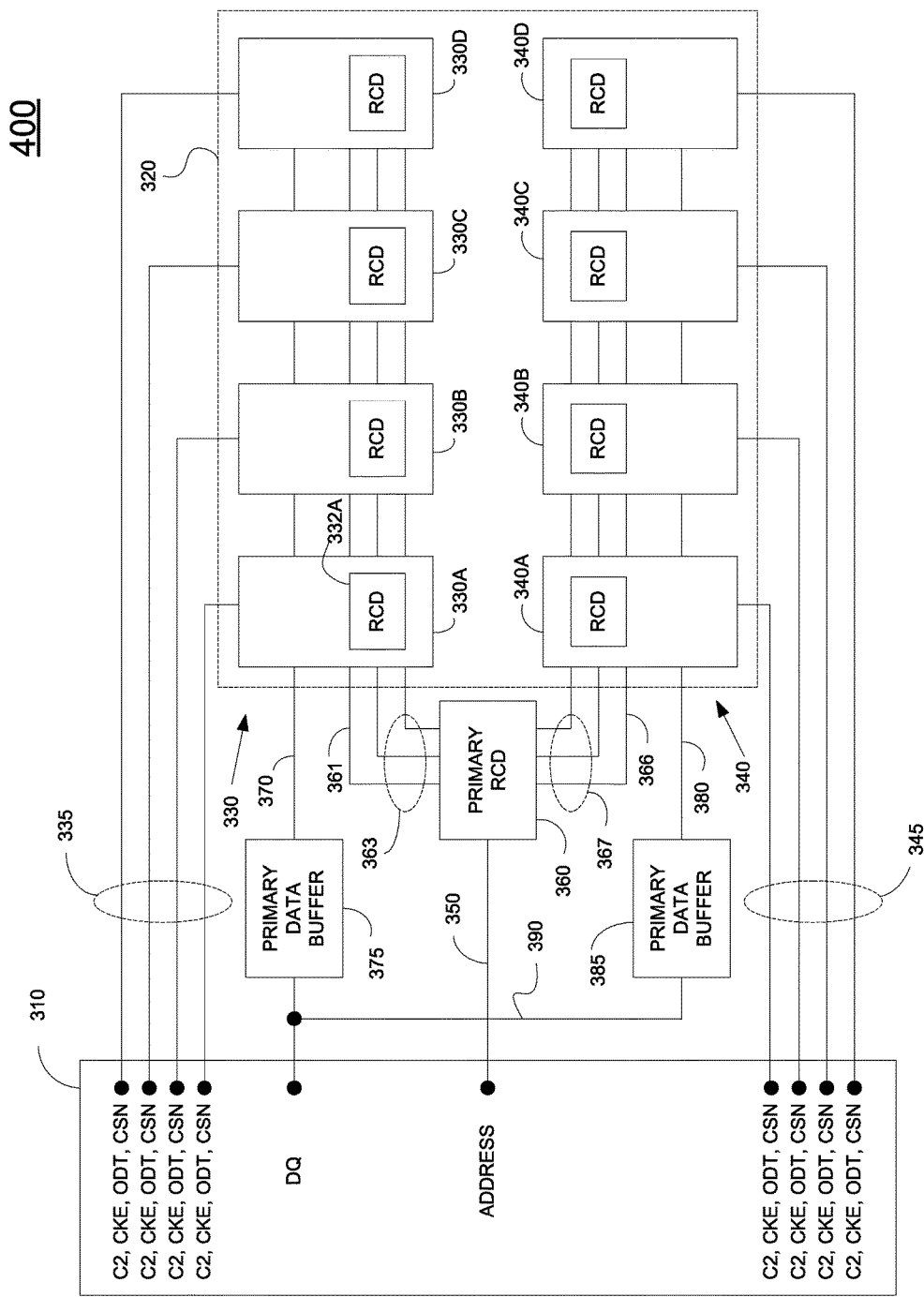
FIG. 4 is a block diagram of a memory unit that is configured for reusing DIMM buffer chips on the mother board to buffer signals in order to increase the number of DIMMs per channel of a memory controller, wherein the DIMMs are configured as R-DIMMs, in accordance with one embodiment of the present disclosure.

FIG. 4 is a block diagram of a memory unit 400 that is configured for reusing DIMM buffer chips on the mother board to buffer signals in order to increase the number of DIMMs per channel of a memory controller, in accordance with one embodiment of the present disclosure. In that manner, the total memory capacity is increased per logical channel of a memory controller. For example, the memory unit may comprise an SMC 140A of FIG. 1 that is include within a memory appliance, and illustrates the connections between a processor or memory controller, primary buffers, and DIMM buffers contained within R-DIMMs, in accordance with one embodiment of the present disclosure. In one embodiment, memory unit 400 is representative of a mother board topology.

In particular, memory unit 400 is similar in configuration as to the memory unit 300 of FIG. 3, wherein like referenced numerals designate identical or corresponding parts. However, instead of LR-DIMMs, memory unit 400 includes registered DIMMs or R-DIMMs. As such, memory 320 includes R-DIMMs, wherein the first set of two or more DIMMs 330 includes DIMMs 330A-D which comprise R-DIMMs, and wherein the second set of two or more DIMMs 340 includes DIMMs 340A-D which comprise R-DIMMs.

Notably, the R-DIMMs do not include any internal data buffers. As such, DIMMs 330A-D in the first set of DIMMs 330 only include the internal RCD address buffer. As such, the communication channel 370 couples the primary data buffer 375 directly to memory devices in each of the DIMMs 330A-D. Also, DIMMs 340A-D in the second set of DIMMs 340 only include the internal RCD address buffer. As such, the communication channel 380 couples the primary data buffer 385 directly to memory devices in each of the DIMMs 340A-D.

Figure 5:
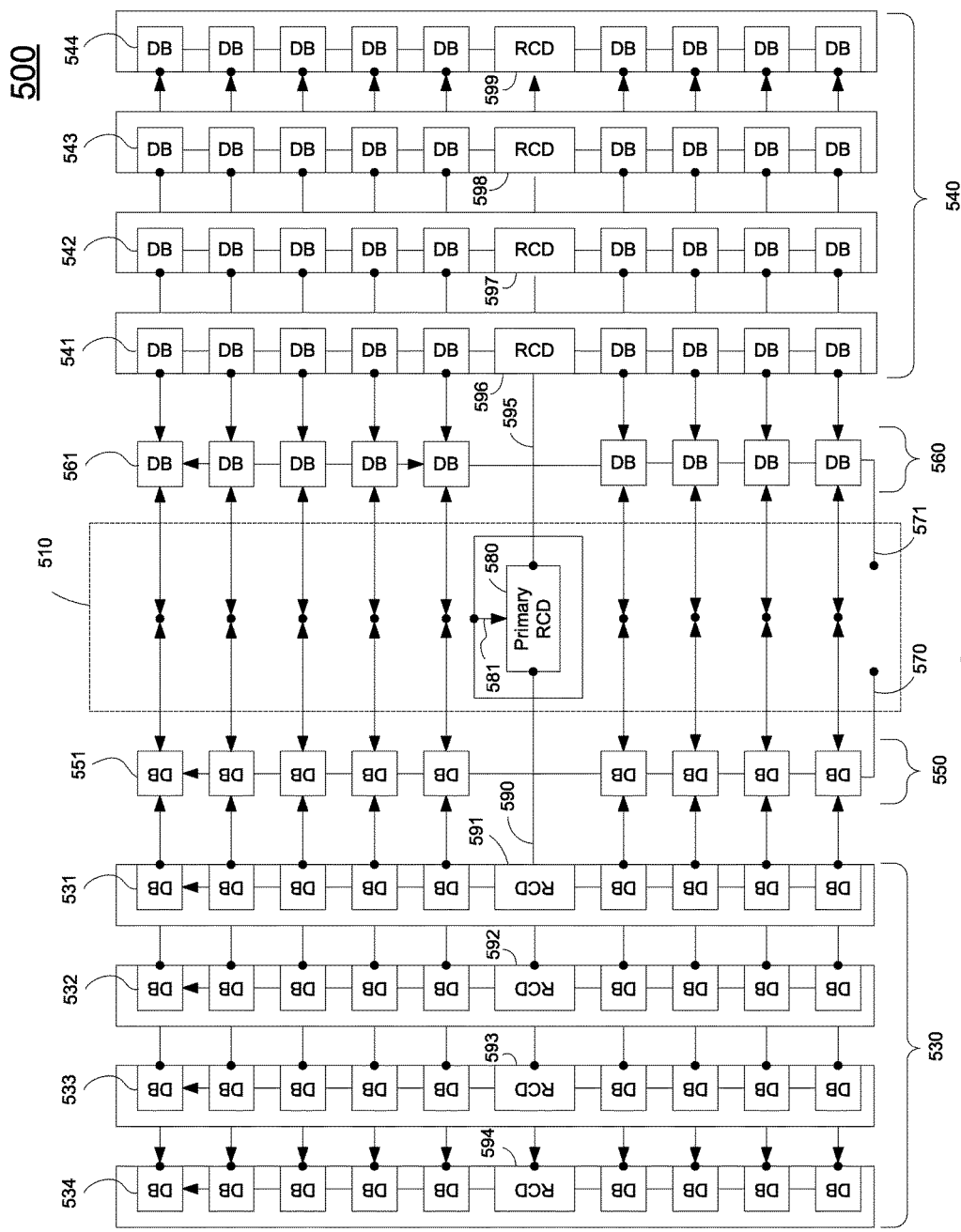
FIG. 5 is a detailed topology of a memory unit introduced in FIG. 3 that is configured for reusing DIMM buffer chips to buffer signals in order to increase the number of DIMMs per channel, in accordance with one embodiment of the present disclosure.

FIG. 5 is a detailed topology of a memory unit 500 that was first introduced as memory unit 300 of FIG. 3, wherein the memory unit 500 is configured for reusing DIMM buffer chips to buffer signals in order to increase the number of DIMMs per channel, in accordance with one embodiment of the present disclosure. For example, the memory unit 500 may comprise an SMC 140A of FIG. 1 that is include within a memory appliance, and illustrates the connections between a processor or memory controller, primary buffers, and DIMM buffers contained within LR-DIMMs, in accordance with one embodiment of the present disclosure.

As shown in FIG. 5, a processor 510 is operable to be coupled to one or more communication channels for purposes of communicating commands and/or operations on content that is included in one or more memory devices distributed across one or more DIMMs. For example, data operations include search, sort, and other custom accelerations. For example, processor 510 comprises a memory controller that may be programmable (e.g., FPGA).

Further, the memory devices are distributed throughout a first and second set of DIMMs, wherein the processor 510 responds to commands to access and perform operations on content stored in the memory devices. The first set of DIMMs 530 includes four DIMMs, and the second set of DIMMs 540 includes four DIMMs. In one embodiment, the memory unit 500 includes eight LR-DIMMs per channel, and four ranks per DIMM.

The first set of DIMMs 530 is coupled to the processor 510 through primary data buffer 550 over a first communication channel. As shown, primary data buffer 550 comprises nine separate physical chips or sub-data buffers, wherein each of the nine sub-data buffers is coupled in parallel to corresponding internal data buffers in each of the DIMMs over a corresponding connection in the first communication channel. For example, sub-data buffer 551 in primary data buffer 550 is coupled in parallel to internal DIMM data buffers 531, 532, 533, and 534.

The second set of DIMMs is coupled to the processor 510 through primary data buffer 560 over a second communication channel. As shown, primary data buffer 560 comprises nine separate physical chips or sub-data buffers, wherein each of the nine data buffers is coupled in parallel to corresponding internal data buffers in each of the DIMMs over a corresponding connection in the second communication channel. For example, data buffer 561 in primary data buffer 560 is coupled in parallel to internal DIMM data buffers 541, 542, 543, and 544.

In addition, a third communication channel is configured to electrically couple the first primary data buffer 550 to the second primary data buffer 560 and the processor 510. For example, the BCOM buses 570 and 571 are electrically coupled to the primary data buffers 550 and 560, respectively, and to the processor 510 (e.g., memory controller). As shown in FIG. 5, BCOM bus 570 comprises a control path from the processor 510 to the on-board primary data buffer 550. Also, BCOM bus 571 comprises a control path from processor 510 to the on-board primary data buffer 560. In another embodiment, a direct communication path (not shown) may be provided between the primary data buffers 550 and 560.

Additionally, the processor 510 provides a command, address, control, clock signal over path 581 to a primary RCD address buffer 580. For example, command, address and control signals include search, sort, read, wire and other custom accelerations.

In addition, command, address, control, and clock connections are provided to each of the DIMMs in the first and second sets of DIMMs 530 and 540. For example, the primary RCD address buffer 580 forwards the command, address, control, and clock signals to an internal RCD address buffer in a corresponding DIMM. That is, each DIMM includes an internal RCD address buffer. For example, primary RCD address buffer 580 forwards command, address, control, and clock signals over path 590 in parallel to internal RCD address buffers 591, 592, 593, and 594 in corresponding DIMMs of the first set of DIMMs 530. Also, primary RCD address buffer 580 forwards command, address, control, and clock signals over path 595 in parallel to internal RCD address buffers 596, 597, 598, and 599 in corresponding DIMMs of the second set of DIMMs 540.

Figure 6:
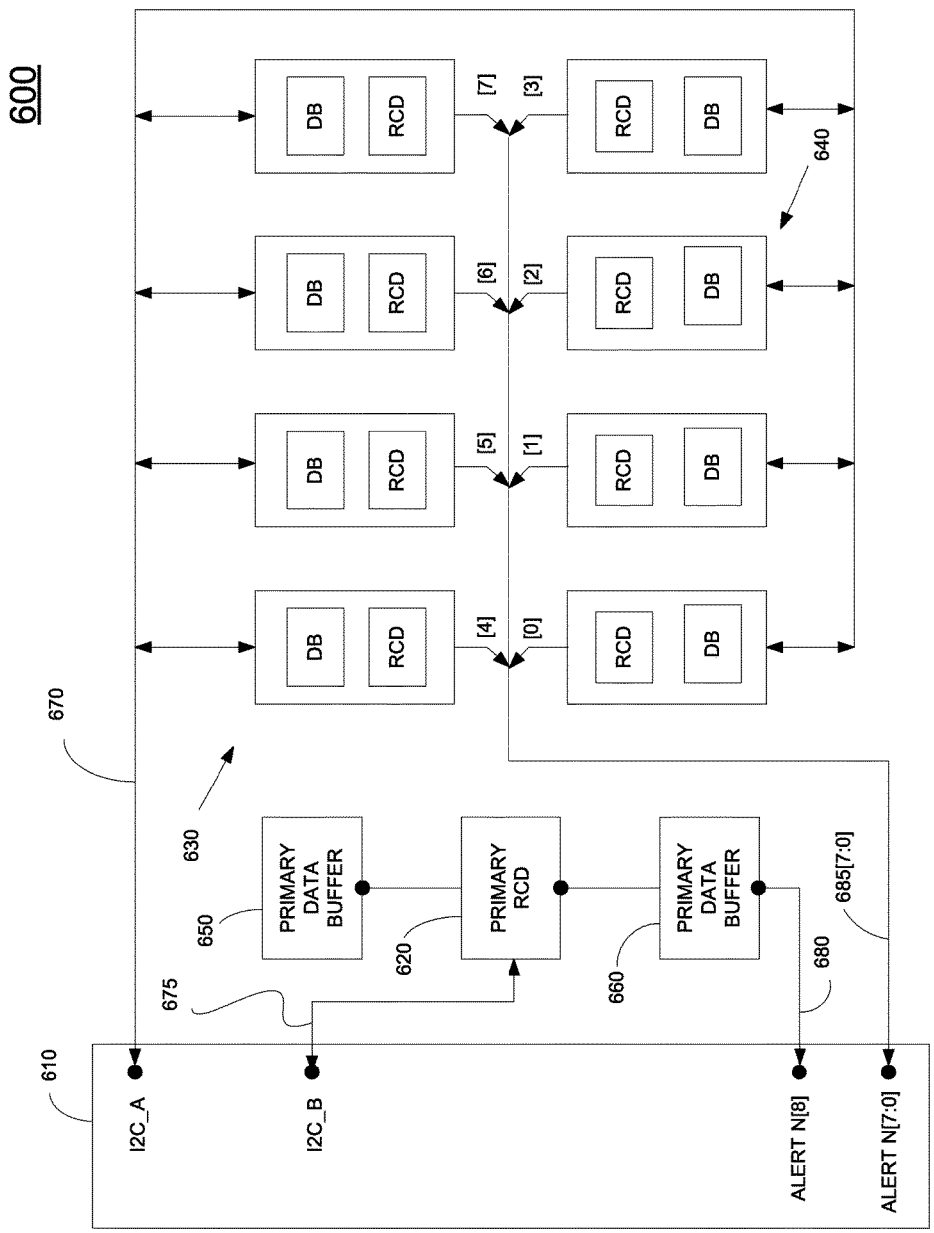
FIG. 6 is a block diagram of a memory unit configured for reusing DIMM buffer chips on the mother board to buffer signals in order to increase the number of DIMMs per channel of a memory controller, including I2C and alert communication channels, in accordance with one embodiment of the present disclosure.

FIG. 6 is a block diagram of a memory unit 600 configured for reusing DIMM buffer chips on the mother board to buffer signals in order to increase the number of DIMMs per channel of a memory controller, including I2C and alert communication channels, in accordance with one embodiment of the present disclosure. For example, memory unit 600 is analogous to the memory units 300, 400, and 500 of FIGS. 3-5.

As shown in FIG. 6, a processor 610 is operable to be coupled to one or more communication channels (not shown) for purposes of communicating commands and/or operations on content that is included in one or more memory devices distributed across one or more DIMMs. For example, processor 610 comprises a memory controller that may be programmable (e.g., FPGA).

Further, the memory devices are distributed throughout a first and second set of DIMMs, wherein the processor 610 responds to commands to access and perform operations on content stored in the memory devices. The first set of DIMMs 630 includes four DIMMs, and the second set of DIMMs 640 also includes four DIMMs. In one embodiment, the memory unit 600 includes eight LR-DIMMs per channel, and four ranks per DIMM. The first set of DIMMs 630 is coupled to processor 610 through primary data buffer 650 over one or more communication channels (not shown). The second set of DIMMs 640 is coupled to processor 610 through primary data buffer 660 over one or more communication channels (not shown). A command, address, or control signal is provided from the processor 610 over a communication path (not shown) to a primary RCD address buffer 620. For example, command, address and control signals include memory operations (e.g., search, sort, read, write, etc.). The primary RCD address buffer 620 forwards the command, address, and control signals to an internal RCD address buffer in a corresponding DIMM, as previously described.

In addition, memory unit 600 includes a plurality of I2C serial buses. In one embodiment, I2C_A bus 670 couples processor 610 to each DIMM in the first set of DIMMs 630 and/or each DIMM in the second set of DIMMs 640. The I2C_A bus is configured for backdoor access to the internal RCD address buffers in the DIMMs in the first and/or second set of DIMMs 630 and 640. In one embodiment, the I2C$_{13}$ A bus 670 is configured for performing calibration of the RCD address buffers in the internal DIMMs.

In another embodiment, I2C_B bus 675 couples processor 610 to the primary RCD address buffer 620. The I2C_B bus 675 is configured for backdoor access, and is configured for performing calibration of the primary RCD address buffer 620.

Further, memory unit 600 includes a plurality of communication paths configured for delivering alert signals. For instance, communication path 680 electrically couples processor 610 in parallel to the primary data buffer 650, primary data buffer 660, and primary RCD address buffer 620. In that case, any errors or alerts generated by the primary data buffer 650, primary data buffer 660, and primary RCD address buffer 620 is communicated over path 680 to the processor 610.

In addition, multiple communication paths 685[7:0] electrically couples processor 610 to each of the DIMMs in the first and second set of DIMMs 630 and 640. Each DIMM is coupled directly to the processor 610 over a corresponding alert path. In that manner, error isolation is quickly performed as an alert is quickly and definitely associated with the DIMM sending the alert. For example, multiple paths 685[7:0] electrically couples processor 610 and DIMMs [7:0].

Portions of the detailed descriptions are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "selecting," "storing," "loading," "reprogramming," "determining," "searching," "moving," "copying," "deleting," "identifying," "executing," "compiling," "providing," or the like, refer to actions and processes of a computer system or similar electronic computing device or processor (e.g., system 810 of FIG. 8). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory, non-volatile memory or other memory technology, CD-ROM, DVDs or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, RF, infrared and other wireless media. Combinations of any of the above can also be included within the scope of computer-readable media.

Figure 7:
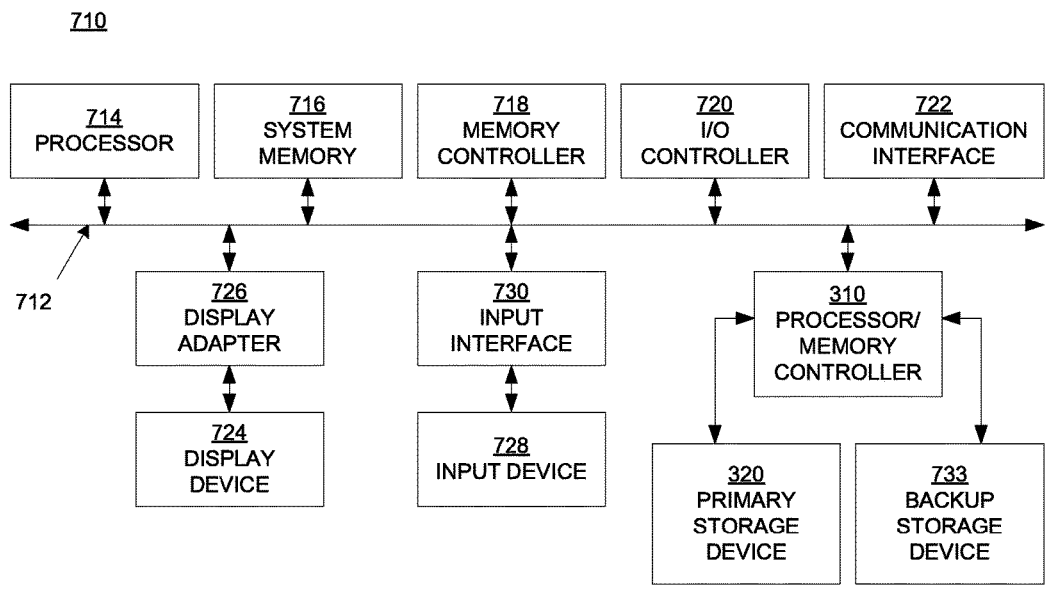
FIG. 7 is a block diagram of an example of a computing system capable of implementing embodiments of the present disclosure.

FIG. 7 is a block diagram of an example of a computing system 710 capable of implementing embodiments of the present disclosure. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the example embodiments described and/or illustrated herein. For example, processor 714 may perform and/or be a means for performing, either alone or in combination with other elements, one or more of the identifying, determining, using, implementing, translating, tracking, receiving, moving, and providing described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, RAM, ROM, FLASH memory, or any other suitable memory device. Although not required, in certain embodiments computing system 710 may include both a volatile memory unit (such as, for example, system memory 716) and a non-volatile storage device (such as, for example, primary storage device 320.

Computing system 710 may also include one or more components or elements in addition to processor 714 and system memory 716. For example, in the embodiment of FIG. 7, computing system 710 includes a memory controller 718, an I/O controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an IISA, PCI, PCIe, or similar bus) and a network. In one embodiment, system memory 716 communicates via a dedicated memory bus.

Memory controller 718 generally represents any type or form of device capable of handling memory or data or controlling communication between one or more components of computing system 710. For example, memory controller 718 may control communication between processor 714, system memory 716, and I/O controller 720 via communication infrastructure 712. Memory controller may perform and/or be a means for performing, either alone or in combination with other elements, one or more of the operations or features described herein.

I/O controller 720 generally represents any type or form of module capable of coordinating and/or controlling the input and output functions of a computing device. For example, I/O controller 720 may control or facilitate transfer of data between one or more elements of computing system 710, such as processor 714, system memory 716, communication interface 722, display adapter 726, input interface 730, and processor/memory controller 310. I/O controller 720 may be used, for example, to perform and/or be a means for performing, either alone or in combination with other elements, one or more of the operations described herein. I/O controller 720 may also be used to perform and/or be a means for performing other operations and features set forth in the instant disclosure.

Communication interface 722 broadly represents any type or form of communication device or adapter capable of facilitating communication between example computing system 710 and one or more additional devices. For example, communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In one embodiment, communication interface 722 provides a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

Communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. Communication interface 722 may perform and/or be a means for performing, either alone or in combination with other elements, one or more of the operations disclosed herein. Communication interface 722 may also be used to perform and/or be a means for performing other operations and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, computing system 710 may also include at least one input device 728 coupled to communication infrastructure 712 via an input interface 730. Input device 728 generally represents any type or form of input device capable of providing input, either computer- or human-generated, to computing system 710. Examples of input device 728 include, without limitation, a keyboard, a pointing device, a speech recognition device, or any other input device. In one embodiment, input device 728 may perform and/or be a means for performing, either alone or in combination with other elements, one or more of the operations disclosed herein. Input device 728 may also be used to perform and/or be a means for performing other operations and features set forth in the instant disclosure.

As illustrated in FIG. 7, computing system 710 may also include a memory appliance. For example, the memory appliance may include a processor/memory controller 310 and primary storage device 320 and a backup storage device 733 coupled to communication infrastructure 712 of FIG. 7. In still other examples, the memory appliance of computing system 710 may include a processor/memory controller and memory devices as illustrated in FIGS. 4-6. Storage devices 320 and 733 generally represent any type or form of storage device or medium capable of storing data and/or other computer-readable instructions. For example, storage devices 320 and 733 may be a plurality of memory devices packaged in a DIMM, R-DIMM, U-DIMM, and/or LR-DIMM, SO-DIMM, SOR-DIMM, VLP R-DIMM, VLP Mini-R-DIMM, Mini-R-DIMM, VLP-U-DIMM, Mini-U-DIMM, VLP-Mini-U-DIMM, magnetic disk drive (e.g., a so-called hard drive), a floppy disk drive, a magnetic tape drive, an optical disk drive, a FLASH drive, or the like. Processor/memory controller 310 generally represents any type or form of interface or device for transferring data between storage devices 320 and 733 and other components of computing system 710.

In one example, databases 740 may be stored in primary storage device 320. Databases 740 may represent portions of a single database or computing device or a plurality of databases or computing devices. For example, databases 740 may represent (be stored on) a portion of computing system 710 and/or portions of example network architecture 800 in FIG. 8 (below). Alternatively, databases 740 may represent (be stored on) one or more physically separate devices capable of being accessed by a computing device, such as computing system 710 and/or portions of network architecture 800.

Continuing with reference to FIG. 7, storage devices 320 and 733 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 320 and 733 may also include other similar structures or devices for allowing computer software, data, or other computer-readable instructions to be loaded into computing system 710. For example, storage devices 320 and 733 may be configured to read and write software, data, or other computer-readable information. Storage devices 320 and 733 may also be a part of computing system 710 or may be separate devices accessed through other interface systems.

Storage devices 320 and 733 may be used to perform, and/or be a means for performing, either alone or in combination with other elements, one or more of the operations disclosed herein. Storage devices 320 and 733 may also be used to perform, and/or be a means for performing, other operations and features set forth in the instant disclosure.

Many other devices or subsystems may be connected to computing system 710. Conversely, all of the components and devices illustrated in FIG. 7 need not be present to practice the embodiments described herein. The devices and subsystems referenced above may also be interconnected in different ways from that shown in FIG. 7. Computing system 710 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 710. All or a portion of the computer program stored on the computer-readable medium may then be stored in system memory 716 and/or various portions of storage devices 320 and 733. When executed by processor 714, a computer program loaded into computing system 710 may cause processor 714 to perform and/or be a means for performing the functions of the example embodiments described and/or illustrated herein. Additionally or alternatively, the example embodiments described and/or illustrated herein may be implemented in firmware and/or hardware. For example, computing system 710 may be configured as an ASIC adapted to implement one or more of the embodiments disclosed herein.

Figure 8:
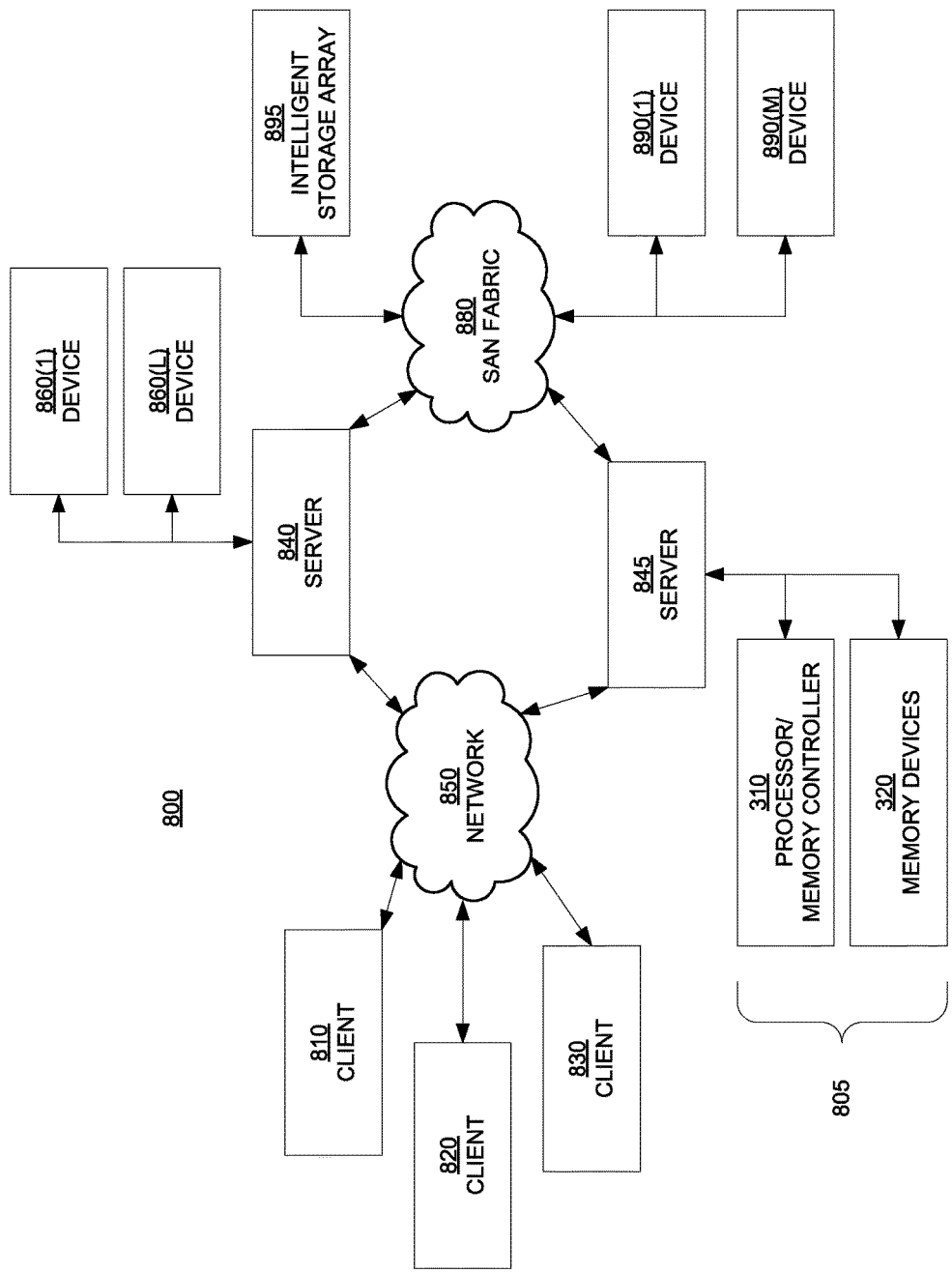
FIG. 8 is a block diagram of an example of a network architecture capable of implementing embodiments of the present disclosure.

FIG. 8 is a block diagram of an example of a network architecture 800 in which client systems 810, 820, and 830 and servers 840 and 845 may be coupled to a network 850. Client systems 810, 820, and 830 generally represent any type or form of computing device or system, such as computing system 710 of FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet.

As illustrated in FIG. 8, one or more storage devices 860(1)-(L) may be directly attached to server 840. Similarly, a memory appliance 805 may be directly attached to server 845, and may include a processor/memory controller 310 and memory devices 320 as illustrated in FIG. 3. In still other implementations, memory appliance 805 may include a processor/memory controller and memory devices as illustrated in FIGS. 4-6. Storage devices 860(1)-(L) and memory devices 320 generally represent any type or form of storage device or medium capable of storing data and/or other computer-readable instructions. For example, as previously introduced, memory devices may be a plurality of memory devices packaged in DIMM, R-DIMM, U-DIMM, and/or LR-DIMM, SO-DIMM, SOR-DIMM, VLP R-DIMM, VLP Mini-R-DIMM, Mini-R-DIMM, VLP-U-DIMM, Mini-U-DIMM, VLP-Mini-U-DIMM, etc. configurations. In one implementation, storage devices 860(1)-(L) and storage devices 320 may represent NAS devices configured to communicate with servers 840 and 845 using various protocols, such as NFS, SMB, or CIFS.

Servers 840 and 845 may also be connected to a SAN fabric 880. SAN fabric 880 generally represents any type or form of computer network or architecture capable of facilitating communication between storage devices. SAN fabric 880 may facilitate communication between servers 840 and 845 and storage devices 890(1)-(M) and/or an intelligent storage array 895. SAN fabric 880 may also facilitate, via network 850 and servers 840 and 845, communication between client systems 810, 820, and 830 and storage devices 890(1)-(M) and/or intelligent storage array 895 in such a manner that devices 890(1)-(M) and array 895 appear as locally attached devices to client systems 810, 820, and 830. As with storage devices 860(1)-(L), storage devices 890(1)-(M) and intelligent storage array 895 generally represent any type or form of storage device or medium capable of storing data and/or other computer-readable instructions.

With reference to computing system 710 of FIG. 7, a communication interface, such as communication interface 722, may be used to provide connectivity between each client system 810, 820, and 830 and network 850. Client systems 810, 820, and 830 may be able to access information on server 840 or 845 using, for example, a Web browser or other client software. Such software may allow client systems 810, 820, and 830 to access data hosted by server 840, server 845, storage devices 860(1)-(L), memory appliance 805, storage devices 890(1)-(M), or intelligent storage array 895. Although FIG. 8 depicts the use of a network (such as the internet) for exchanging data, the embodiments described herein are not limited to the Internet or any particular network-based environment.

Returning to FIG. 8, in one embodiment, all or a portion of one or more of the example embodiments disclosed herein are encoded as a computer program and loaded onto and executed by server 840, server 845, storage devices 860(1)-(L), memory appliance 805, storage devices 890(1)-(M), intelligent storage array 895, or any combination thereof. All or a portion of one or more of the example embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the operations disclosed herein. Network architecture 800 may also be used to perform and/or be a means for performing other operations and features set forth in the instant disclosure.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., Vmware vCloud, Open Stack, and Microsoft Azure). Further, the above described embodiments may be used, in whole or in party, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, and Low-Latency networking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A system comprising:
    a processor coupled to one or more communication channels to communicate commands;
    a first communication channel electrically coupling a first set of two or more dual in-line memory modules (DIMMs) and a first primary data buffer on a mother board, wherein at least one DIMM in said first set of two or more DIMMs comprises a first internal data buffer coupled to said first primary data buffer via said first communication channel;
    a second communication channel electrically coupling a second set of two or more DIMMs and a second primary data buffer on said mother board, wherein at least one DIMM in said second set of two or more DIMMs comprises a second internal data buffer coupled to said second primary data buffer via said second communication channel; and a third communication channel electrically coupling said first primary data buffer to said second primary data buffer, and coupling said first primary data buffer and said second primary data buffer to said processor.

2. The system of claim 1, wherein said first communication channel is coupled in parallel to DIMMs in said first set of two or more DIMMs.

3. The system of claim 1, wherein said second communication channel is coupled in parallel to DIMMs in said second set of two or more DIMMs.

4. The system of claim 1, wherein:
said processor comprises a controller that is programmable; and
said controller is configured to respond to commands to access content stored in one or more of a plurality of memory devices distributed throughout said first and second sets of two or more DIMMs and to perform data operations on content accessed from said plurality of memory devices.

5. The system of claim 4, wherein said controller comprises a field programmable gate array (FPGA).

6. The system of claim 4, wherein said plurality of memory devices comprises memory devices packaged in a DIMM comprising at least one of a registered DIMM (RDIMM), a load reduced DIMM (LRDIMM), or an unregistered DIMM (UDIMM).

7. The system of claim 1, wherein said first and second sets of two or more DIMMs comply with a double data-rate (DDR) standard or one of its derivatives.

8. The system of claim 1, further comprising a plurality of I2C buses, each I2C bus coupling said processor to a corresponding DIMM in said first set of two or more DIMMs or said second set of two or more DIMMs and configured for communicating an alert.

9. The system of claim 1, further comprising a plurality of I2C buses, each I2C bus coupling said processor to a corresponding DIMM in said first set of two or more DIMMs or said second set of two or more DIMMs and configured for performing calibration.

10. The system of claim 1, wherein said third communication channel comprises a BCOM bus.

11. A system comprising:
a plurality of memory devices;
a memory controller configured to respond to commands from a command interface to access content stored in one or more of said plurality of memory devices and to perform data operations on content accessed from said plurality of memory devices;
a first communication channel electrically coupling a first set of two or more dual in-line memory modules (DIMMs) comprising memory devices and a first primary data buffer on a mother board, wherein at least one DIMM in said first set of two or more DIMMs comprises a first internal data buffer coupled to said first primary data buffer via said first communication channel;
a second communication channel electrically coupling a second set of two or more DIMMs comprising memory devices and a second primary data buffer on said mother board, wherein at least one DIMM in said second set of two or more DIMMs comprises a second internal data buffer coupled to said second primary data buffer via said second communication channel; and
a third communication channel electrically coupling said first primary data buffer to said second primary data buffer, and coupling said first primary data buffer and said second primary data buffer to said memory controller.

12. The system of claim 11, wherein said memory controller is programmable.

13. The system of claim 12, wherein said memory controller comprises a field programmable gate array (FPGA).

14. The system of claim 11, wherein said plurality of memory devices comprise memory devices packaged in load reduced DIMM (LRDIMM).

15. The system of claim 11, wherein said first primary data buffer and said first internal data buffer are identical.

16. The system of claim 11, wherein said first primary data buffer and said second primary data buffer are configured to sample and retransmit data.

17. A system comprising:
a processor coupled to one or more communication channels to communicate commands;
a first communication channel electrically coupling a first set of two or more dual in-line memory modules (DIMMs) and a first primary data buffer on a mother board, wherein at least one DIMM in said first set of two or more DIMMs comprises a first internal data buffer coupled to said first primary data buffer via said first communication channel;
a second communication channel electrically coupling a second set of two or more DIMMs and a second primary data buffer on said mother board, wherein at least one DIMM in said second set of two or more DIMMs comprises a second internal data buffer coupled to said second primary data buffer via said second communication channel; and
a third communication channel electrically coupling said first primary data buffer to said second primary data buffer, and coupling said first primary data buffer and said second primary data buffer to said processor, wherein said first primary data buffer and said second primary data buffer are configured to sample and retransmit data.

* * * * *